March 14, 1967 W. H. BUSSEY 3,309,604
MAGNETIC CORE FREQUENCY MULTIPLIER AND METHOD
OF CONSTRUCTING THE SAME
Filed Oct. 17, 1963 6 Sheets-Sheet 1

INVENTOR.
WILLIAM H. BUSSEY
BY
Wolfe, Hubbard, Voit & Osann
ATTYS.

March 14, 1967 W. H. BUSSEY 3,309,604
MAGNETIC CORE FREQUENCY MULTIPLIER AND METHOD
OF CONSTRUCTING THE SAME
Filed Oct. 17, 1963 6 Sheets-Sheet 2
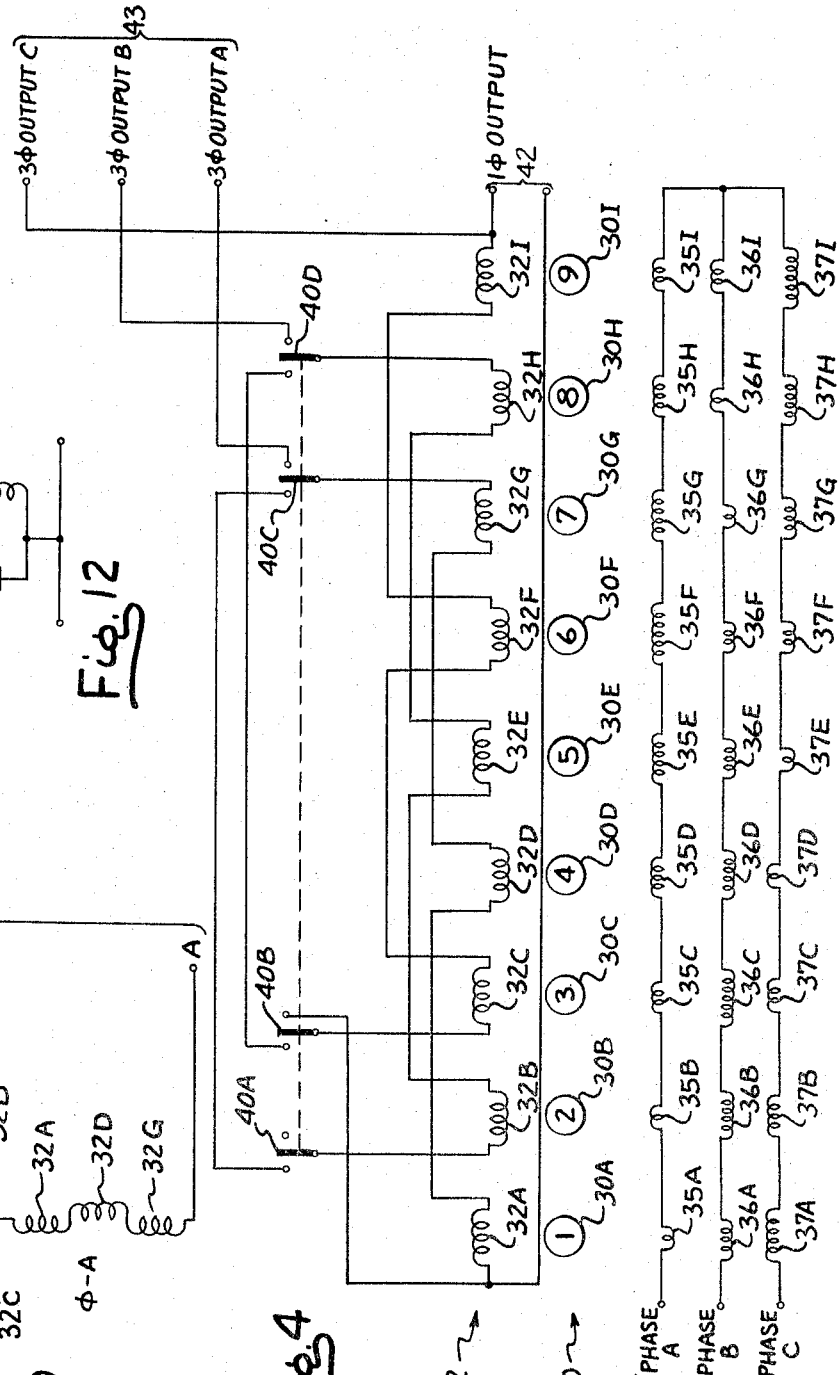
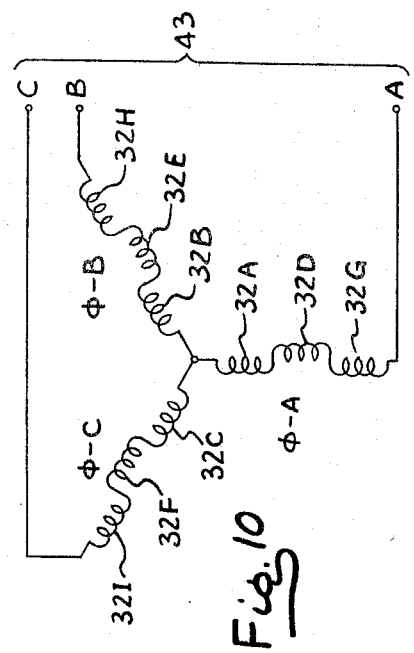
INVENTOR.
WILLIAM H. BUSSEY
BY
Wolfe, Hubbard, Voit & Osann
ATTYS.

March 14, 1967     W. H. BUSSEY     3,309,604
MAGNETIC CORE FREQUENCY MULTIPLIER AND METHOD
OF CONSTRUCTING THE SAME
Filed Oct. 17, 1963     6 Sheets-Sheet 4

| WINDING RUN | PHASE A | | | | | | | |
|---|---|---|---|---|---|---|---|---|
| | 30B | 30C | 30D | 30E | 30F | 30G | 30H | 30I |
| 1ST | | | | | 6 | | | |
| 2ND | | | | 17 | 17 | 17 | | |
| 3RD | | | 25 | 25 | 25 | 25 | 25 | |
| 4TH | | 31 | 31 | 31 | 31 | 31 | 31 | 31 |
| 5TH | 17 | 17 | 17 | 17 | 17 | 17 | 17 | 17 |

INVENTOR.
WILLIAM H. BUSSEY
BY
Wolfe, Hubbard, Voit & Osann
ATTYS.

| CORE NO. | PHASE A | | PHASE B | | PHASE C | |
|---|---|---|---|---|---|---|
| | RELATIVE | ACTUAL n=96 | RELATIVE | ACTUAL n=96 | RELATIVE | ACTUAL n=96 |
| 30A | $T_{AA}=n(-\sin 10°)=-.174n$ | $T_{AA}=-17$ | $T_{AB}=n(-\sin 50°)=-.76n$ | $T_{AB}=-73$ | $T_{AC}=n(\sin 70°)=.94n$ | $T_{AC}=90$ |
| 30B | $T_{BA}=n(\sin 10°)=.174n$ | $T_{BA}=17$ | $T_{BB}=n(-\sin 70°)=-.94n$ | $T_{BB}=-90$ | $T_{BC}=n(\sin 50°)=.76n$ | $T_{BC}=73$ |
| 30C | $T_{CA}=n(\sin 30°)=.50n$ | $T_{CA}=48$ | $T_{CB}=n(-\sin 90°)=-1.00n$ | $T_{CB}=-96$ | $T_{CC}=n(\sin 30°)=.50n$ | $T_{CC}=48$ |
| 30D | $T_{DA}=n(\sin 50°)=.76n$ | $T_{DA}=73$ | $T_{DB}=n(-\sin 70°)=-.94n$ | $T_{DB}=-90$ | $T_{DC}=n(\sin 10°)=.174n$ | $T_{DC}=17$ |
| 30E | $T_{EA}=n(\sin 70°)=.94n$ | $T_{EA}=90$ | $T_{EB}=n(-\sin 50°)=-.76n$ | $T_{EB}=-73$ | $T_{EC}=n(-\sin 10°)=-.174n$ | $T_{EC}=-17$ |
| 30F | $T_{FA}=n(\sin 90°)=1.00n$ | $T_{FA}=96$ | $T_{FB}=n(-\sin 30°)=-.50n$ | $T_{FB}=-48$ | $T_{FC}=n(-\sin 30°)=-.50n$ | $T_{FC}=-48$ |
| 30G | $T_{GA}=n(\sin 70°)=.94n$ | $T_{GA}=90$ | $T_{GB}=n(-\sin 10°)=-.174n$ | $T_{GB}=-17$ | $T_{GC}=n(-\sin 50°)=-.76n$ | $T_{GC}=-73$ |
| 30H | $T_{HA}=n(\sin 50°)=.76n$ | $T_{HA}=73$ | $T_{HB}=n(\sin 10°)=.174n$ | $T_{HB}=17$ | $T_{HC}=n(-\sin 70°)=-.94n$ | $T_{HC}=-90$ |
| 30I | $T_{IA}=n(\sin 30°)=.50n$ | $T_{IA}=48$ | $T_{IB}=n(\sin 30°)=.50n$ | $T_{IB}=48$ | $T_{IC}=n(-\sin 90°)=-1.00n$ | $T_{IC}=-96$ |

Fig. 8

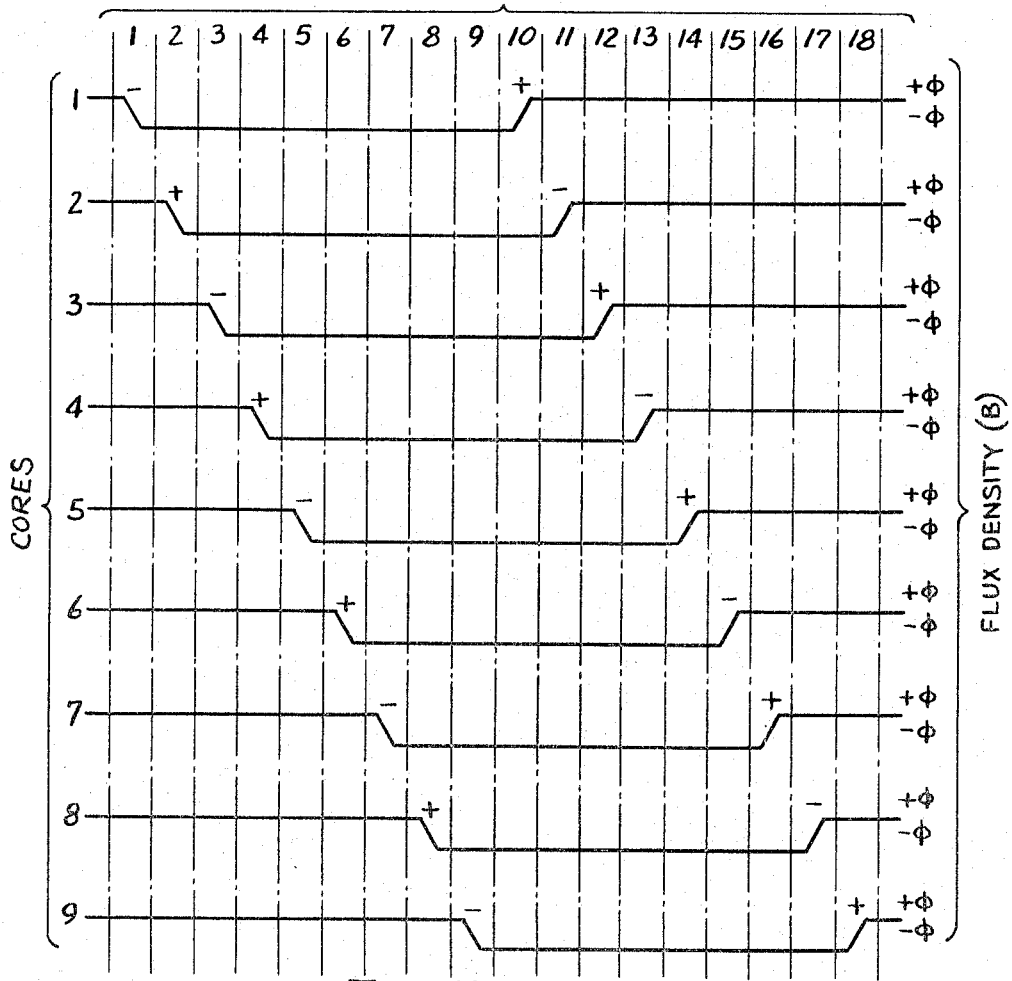
Fig. 11a
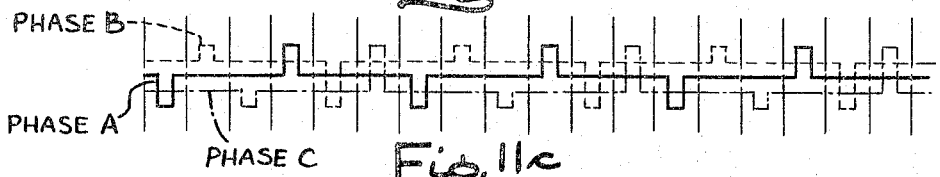
Fig. 11b
PHASE B
PHASE A
PHASE C
Fig. 11c

# United States Patent Office 3,309,604
Patented Mar. 14, 1967

3,309,604
MAGNETIC CORE FREQUENCY MULTIPLIER
AND METHOD OF CONSTRUCTING THE
SAME
William H. Bussey, Rockford, Ill., assignor to The
E.M.U. Company, Inc., Rockford, Ill., a corporation
of Delaware
Filed Oct. 17, 1963, Ser. No. 316,936
15 Claims. (Cl. 321—68)

This invention relates to multiple core frequency multipliers and the method of constructing the same, and more specifically relates to static devices for converting polyphase alternating currents of a first frequency into single phase or polyphase alternating currents of a higher frequency and the method of construction thereof.

It is known in the art to utilize the magnetic saturation characteristics of certain ferromagnetic core materials in peaking or pulse transformers which produce output pulses that recur at the frequency of an input or driving wave. In such known techniques, a magnetic core is driven between positive and negative magnetic saturation in response to the receipt of a sinusoidal or other wave form having cyclically recurring positive-going and negative-going half cycles. Each time that a driving wave form changes direction, the core material is driven from magnetic saturation in one direction to magnetic saturation in the opposite direction, thereby producing a magnetic flux change within such core material. The change in magnetic flux induces an output pulse in an output winding electromagnetically associated with the core. After the core material saturates during a half cycle in the driving wave, there is substantially no magnetic flux change responsive to a continued flow of current during the remainder of that half cycle. When the driving wave changes direction, the magnetic flux in the core material is reversed and the core is driven to magnetic saturation in the opposite direction.

In many applications, an increase in the frequency of the alternating supply results in economy of construction, lower cost, smaller size and lighter weight for the associated apparatus. Additionally, the efficiency of operation of apparatus driven by alternating current may be increased by increasing the frequency of the alternating supply. For instance, when a fluorescent lighting system is powered by an alternating supply having a frequency on the order of 540 cycles per second rather than the standard frequency of 60 c.p.s., a low cost capacitor ballast or a low cost inductor-capacitor ballast may be utilized for controlling the operation thereof, a greater amount of lighting is provided by each fluorescent lamp, and the fluorescent lamps have a longer useful life. These advantages will also result in all other gaseous tube lighting operations, for example, ultraviolet and infrared applications. Additionally, high frequency driving sources have proved advantageous for (1) driving sonic or ultrasonic processing devices, (2) driving induction motors for machine tools requiring higher speeds, since the output of an induction motor increases with increased frequency of the input, (3) driving induction motors in applications requiring standard speeds which results in the motors being smaller in size and lighter in weight, (4) driving induction heating and welding devices, and (5) testing 400-cycle aircraft equipment.

To multiply the frequency of the driving wave, either a plurality of parts of a single multipolar core or a plurality of cores are sequentially reversed in polarity of saturation so that magnetic flux changes are induced therein which in turn induce output voltage pulses in output windings electromagnetically associated i.e., linked therewith. Stated in other words, a plurality of parts of a single multipolar core or a plurality of cores may be sequentially driven through reversals of magnetic saturation to produce bidirectional pulses in an output circuit which recur at a frequency that is a multiple of the frequency of the driving wave.

In the past, the typical multipolar core structures used to increase output frequencies have been very complex and have proven to be quite expensive. Likewise, multiple core structures have also proved to be quite complex and quite expensive.

An object of the present invention is to provide new and improved static frequency multiplying apparatus. A related object is to provide a new and improved method of constructing such static frequency multiplying apparatus.

In this connection, an object of this invention is to provide improved peaking or pulse transformer means that produce bidirectional output pulses or an alternating current wave form having a frequency which is a multiple of the frequency of an input or driving wave. A further object of this invention is to provide improved means for utilizing the characteristics of a polyphase driving wave to produce high frequency bidirectional output signals of one or more phases. Still another object is to provide such frequency multiplying apparatus characterized in that high power, in the order of watts to tens or hundreds of kilowatts, may be provided thereby.

It is also an object of this invention to provide a static frequency multiplier wherein a large multiplication factor may be obtained without requiring specially designed, high cost core parts which are expensive and difficult to assemble or manufacture, especially in connection with low quantity production runs.

A further object is to provide a static frequency multiplier which will not be damaged when the output thereof is short-circuited.

A general object of this invention is to provide a static frequency multiplier characterized in its efficiency, economy, low weight, small size, low maintenance requirements, and cost saving.

The above-mentioned and other objects and advantages of this invention will be apparent upon reading the attached detailed description and upon reference to the accompanying drawings, in which:

FIG. 4 illustrates schematically the organization of the improved frequency multiplying apparatus embodying the features of the present invention and specifically illustrates such apparatus having a multiplication factor of nine;

FIG. 8 is a table illustrating the relationship between winding turns for the distributed windings as determined by the graph in FIG. 7;

FIG. 10 illustrates schematically the relationship between the output windings of FIG. 4 when a three-phase output is to be provided having a multiplication factor of three;

FIG. 11a shows how the cores of FIG. 4 are driven between opposite conditions of saturation;

FIG. 11b shows the bidirectional output signals produced by the cores of FIG. 4 when a single phase output is to be provided;

FIG. 11c shows the bidirectional output signals produced by the cores in FIG. 4 when a three-phase output is to be provided; and FIG. 12 shows a resonant circuit which may be connected to the single-phase output terminals of FIG. 4 to provide a sinusoidal output wave form.

While the invention has been described in connection with a certain preferred embodiment, it is to be understood that the invention is not to be limited to the disclosed embodiment but, on the contrary, the invention is intended to cover the various modifications and equivalent arrangements included within the spirit and scope of the appended claims.

Figure 1:
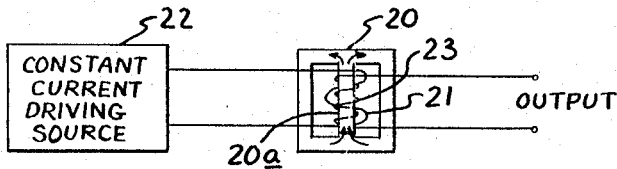
FIGURE 1 shows the circuit of a simple peaking or pulse transformer which illustrates the principles utilized in the subject invention.
Figure 2:
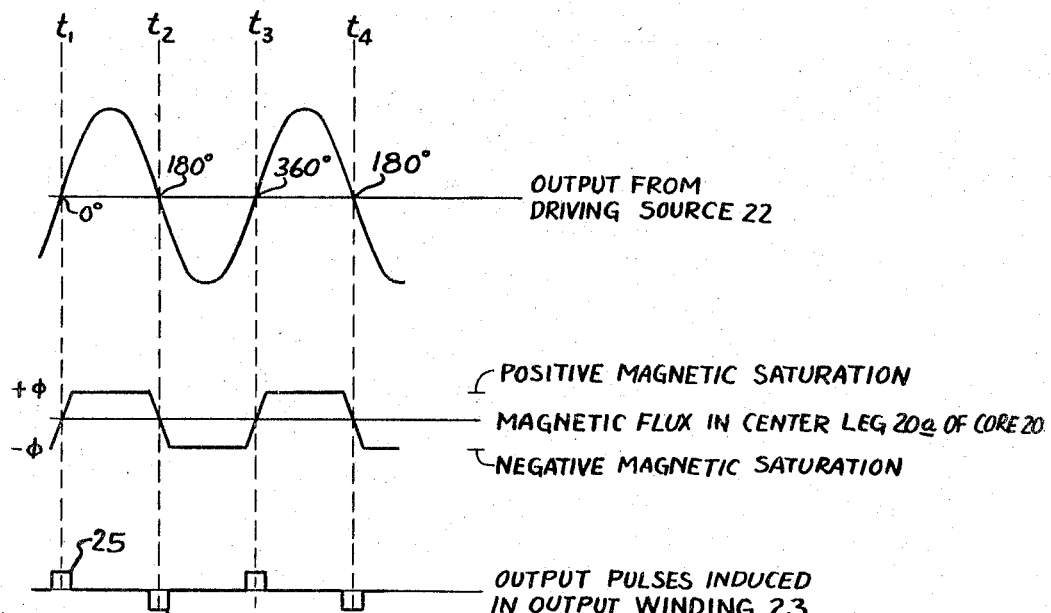
FIG. 2 is a graphical representation of an input or driving wave, the flux change produced in the core material responsive thereto, and the output wave form produced by such flux change for the simple peaking transformer shown in FIG. 1.

Turning now to FIG. 1, there is shown the basic circuit of a peaking transformer having a core 20 in the form of a figure eight wherein the center leg 20a thereof may be driven into magnetic saturation in response to the energization of an input winding 21 from a constant current driving source 22. The output current of the driving source 22 has positive and negative half cycles as shown in FIG. 2. Each time the direction of current flow is reversed, the magnetic flux in the core 20 is reversed so that the center leg 20a is driven to the opposite condition of saturation. As the magnetic flux crosses the zero axis (FIG. 2), an output pulse is induced in an output winding 23 wound on the center leg 20a. It will be apparent that the flux in the center leg 20a rises rapidly from negative magnetic saturation to positive magnetic saturation at time $t_1$, as shown in FIG. 2, and then changes very little during the remainder of the half cycle while the center leg remains in the saturated condition. In response to the next half cycle of the current from the driving source, the flux in the center leg 20a drops rapidly from positive magnetic saturation to negative magnetic saturation at time $t_2$. Hence, two output pulses 25 and 26 of opposite polarities are induced in the output winding 23 during each cycle of the current from the driving source 22, as shown in FIG. 2.

In accordance with the present invention, a plurality of peaking transformers are arranged so that magnetic flux in each transformer core is driven by a polyphase input wave through the zero axis between magnetic saturation in opposite directions at different time intervals, during each cyclical period of the input wave, to induce a number of bidirectional output pulses which correspond in number to the number of cores that are used. During any given time interval, when the flux in one core is then being driven across the zero axis, the remaining cores will not be affected and accordingly remain in their present saturated conditions. Although the invention contemplates the use of any suitable number of cores driven by a multiphase input wave having any suitable number of phases, the invention will be described in connection with a series or chain of nine cores which together provide eighteen crossings of the zero axis of magnetization, i.e., produce eighteen alternating polarity output pulses, responsive to each complete cycle of a three-phase driving wave. It will be apparent that the multi-phase driving wave may be produced by feeding a single-phase supply into a phase splitter. Further, though the invention contemplates the use of cores taking any desired shape, the invention will be described in connection with cores taking the form of a figure eight, such cores being readily formed by interleaving conventional E and I transformer core laminations as illustrated in an exemplary form in FIG. 3.

Referring to FIG. 4, an exemplary frequency multiplier is schematically illustrated which includes nine saturable transformer cores indicated generally at 30A–30I, a Y-connected three-phase input circuit 31, and an output circuit 32 including a plurality of output windings 32A–32I electromagnetically and respectively associated with the cores 30A–30I. As may be seen, the Y-connected input circuit 31 includes three branches designated phases A–C, each of which is energized by an individually associated phase of a three-phase sinusoidal input current or driving wave. Moreover, each core has one input winding in each of the three branches of the Y input circuit electromagnetically associated therewith so that, at any given instant, the magnetomotive force produced in that core in response to the application of the three driving wave phases to the input windings is equal to the sum of such forces produced in response to the application of each driving wave phase to the associated input winding. For example, windings 35A, 36A and 37A associated with core 30A have numberse of winding turns which are distributed in accordance with the phase relationship of the driving wave as will be discussed in detail hereinafter. Additionally, the sense or polarity of winding 37A is opposite to that of windings 35A and 36A since the magnetic sense or polarity of each winding is shown by the direction of turns. Accordingly, the flux in core 30A crosses the zero axis only when the algebraic sum of the ampere-turns resulting from the instantaneous values of the three-phase currents equals zero and the core is driven from one state of saturation to the other state of saturation in response to the algebraic sum changing from a maximum value of one polarity to a maximum value of the opposite polarity.

In similar manner, the number of winding turns of the three input windings associated with the remainder of the cores 30B–30I are distributed in accordance with the phase relationship of the driving wave and the winding ratios for all the cores are different, i.e., no two cores have windings distributed in accordance with the same ratio. As a result, the flux in each core is driven across the zero axis in response to a different interphase relationship between the three input current phases applied to the three input windings. Hence, the nine cores will be driven between the two conditions of saturation at different times during each cycle of the three-phase input wave. That is, the cores will be sequentially driven from a first condition of saturation to a second condition of saturation and then will be sequentially driven from the second condition of saturation back to the first condition of saturation during each cycle of the three-phase input wave.

It is to be understood that the input winding patterns shown in FIG. 4 are merely illustrative of the actual winding patterns, which vary according to sinusoidal functions as will be discussed later, and, accordingly, the actual ratios of the windings for the cores do not correspond to the ratios of the loops shown in FIG. 4.

Figure 5:
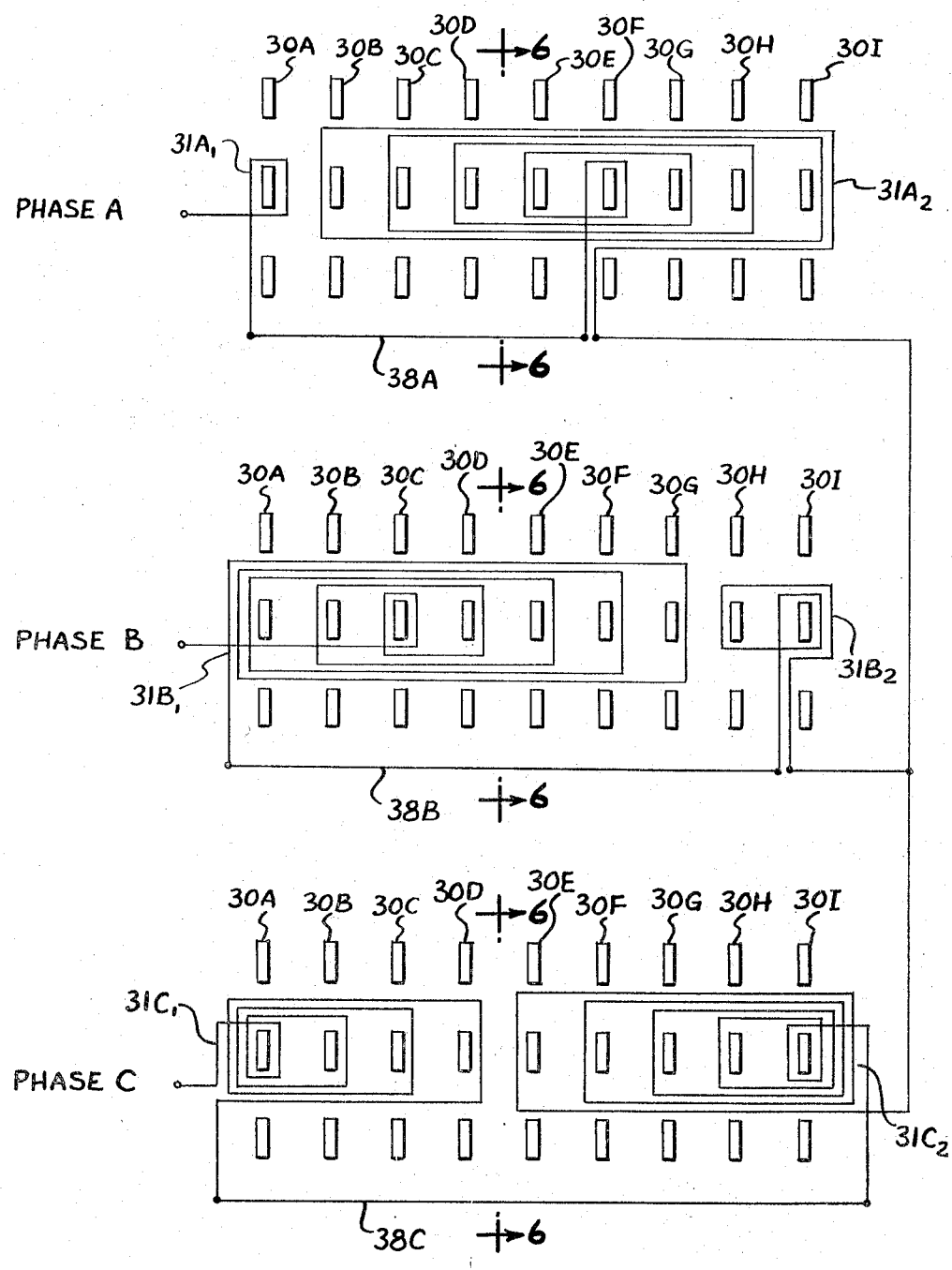
FIG. 5 is a diagrammatic illustration of a portion of a frequency multiplying circuit constructed in accordance with the present invention wherein the relationship between distributed input windings and saturable cores is shown.

In accordance with a primary feature of the present invention, distributed input windings are associated with the series of cores 30A–30I. More specifically, three distributed input windings are prewound so that the numbers of turns thereof associated with each core are distributed in accordance with a different ratio and, subsequently, the distributed windings are physically associated with the cores so as to surround the center legs thereof with the desired prewound numbers of turns. Referring to FIG. 5, three such distributed input windings 31A, 31B and 31C are illustrated wherein the ratios of the numbers of turns associated with the cores 30A–30I are again merely illustrative of the actual ratios.

As may be seen, the windings 31A–31C each have two sections wherein the winding turns are wound in opposite directions, the turns in one direction representing a positive direction and the turns in the opposite direction representing a negative direction. It follows that either single hybrid distributed windings must be provided or two distributed windings must be provided for each phase which are connected together by a common conductor. For example, distributed windings 31A1 and 31A2, 31B1 and 31B2, and 31C1 and 31C2 may be independently wound and subsequently connected together by means of conductors 38A, 38B and 38C after the windings have been positioned over the center legs of the cores 30A–30I. It will be apparent to those skilled in the art that such distributed windings may be manually or automatically prewound. Additionally, it will be apparent that the windings may be distributed in accordance with various winding patterns wherein the polarity relationships are different than in the exemplary embodiment.

In the construction of a frequency multiplier as shown in the exemplary embodiment, a desired number of distributed windings, for example three, are formed having desired turns ratios to be electromagnetically associated with a selected number of cores. The distributed windings may, for example, be formed from enameled copper wire. A plurality of output windings, corresponding in number to the selected number of cores, are also preformed. The output windings may be formed of ordinary magnetic copper wire as utilized for standard transformer windings. The distributed windings and the output windings are then positioned on a mounting jig or the like with the distributed windings surrounding the output windings, the output windings being placed in positions corresponding to the desired core positions. Subsequently, the cores are associated with the windings. The distributed windings and the output windings may then be connected in desired arrangements.

For purposes of illustrating the arrangement of the distributed windings with respect to the cores, FIG. 5 shows each of the windings 31A1 and 31A2, 31B1 and 31B2, and 31C1 and 31C2 as having a series of loops (a loop being one turn of the winding) with each loop electromagnetically interlinking one or more cores in addition to those interlinked by a preceding loop of the series. Thus, the first loop of winding 31A2, for example, is wound around the center leg of core 30F, the second is wound in addition around cores 30E and 30G and so on. Such single loop construction may be used. Actually, as described in more detail in connection with FIGS. 8 and 9, more often the windings are so arranged that a group of several loops or turns of a particular winding are wound the center legs of a given number of cores and are thus interlinked with those cores and then a subsequent group of several loops are interlinked with the same cores and with one or more additional cores. Thus, it is correct to state that there is provided in the preferred embodiment of the invention a number of distributed windings corresponding the number of input phases, and that each winding includes at least one set of several groups of turns, with each group including one or more turns, with turns of each successive group of a given set electromagnetically linking at least one core in addition to those linked by turns of the preceding group in the set. Furthermore, as described in detail in connection with FIG. 8, successive ones of the cores are linked by different combinations of turns of the windings and the number and sense of turns linking the successive cores are selected so that the successsive cores will be driven from one state of saturation to the other state of saturation at different times durign each cycle of the polyphase current applied to the windings.

Figure 3:
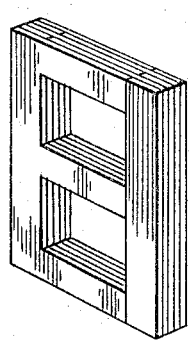
FIG. 3 is a perspective view of a typical interleaved E–I lamination core utilized in the present frequency multiplier.

As previously mentioned with respect to FIG. 3, the cores are formed by stacking pluralities of E and I transformer core laminations in interleaved relationship, i.e., the directions of the E core sections are alternately reversed. However, it is to be understood that the cores may likewise be formed from any other transformer laminations, such as U and L laminations. For normal frequency multiplying applications, the laminations may be formed of ordinary transformer steel, whereas in high frequency multiplying applications, the laminations must be constructed of thinner ferromagnetic material. Accordingly, for normal frequency multiplying applications, the laminations may, for example, be constructed of 29 gauge high silicon steel, permalloy or the like. Since the laminations are to be interleaved, it follows that the cores must be formed about the windings. For this purpose, the E core sections of a core are associated with the windings such that the center legs are alternately inserted within an output winding from opposite ends thereof and the outer legs encompass the output windings and the distributed windings. Upon each E section being associated with the windings, an I section is associated therewith so that the completed core is in the form of a figure eight.

It will be apparent that, with the spaced relationship between the distributed windings and the cores as illustrated in FIG. 5, a certain amount of leakage flux flow will result during operation. Such leakage flux flow is desirable since it does away with the requirement for input reactances in series with the input windings. In frequency multipliers wherein input windings are individually wound on the cores and there is little leakage flux, input reactances must be connected in series with series arrangements of such input windings to limit the flow of current therethrough whereby the frequency multiplier is protected against damage in the face of high surge currents and varying input voltages. With the arrangement illustrated in FIG. 5, the leakage flux flow performs the same function as input reactance and thus limits the current flow so as to protect the requency multiplier againt high surge and varying input voltages It is to be understood, however, that it is not desirable to have too much leakage flux flow. Accordingly, the cores and the distributed windings must be physically related so that only a desirable amount of leakage flux flow exists.

Figure 6:
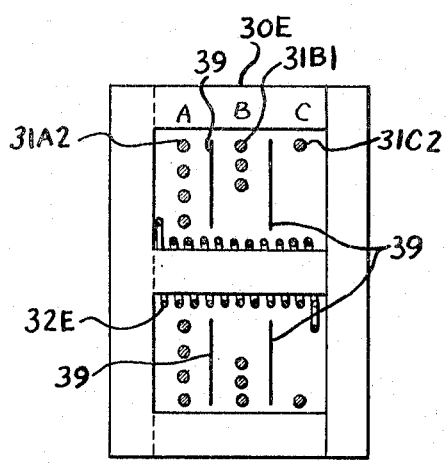
FIG. 6 is an end view of the middle core in FIGS. 4 and 5 illustrating the relationship between the core, the distributed input windings and an output winding.

In order to provide a better understanding of the physical relationship between the components of the frequency multiplier, reference is made to FIG. 6 wherein a cross-sectional end view is shown adjacent the fifth core 30E illustrated in FIGS. 4 and 5. As may be seen, the output winding 32E is positioned over the center legs of the E core laminations and the distributed windings 31A2, 31B1 and 31C2 are disposed in spaced relatonships about the center legs of the E core laminations. Additionally, the I core laminations are in abutting relationship with the E core laminations. To prevent misoperation in the face of contact between the distributed windings, insulating members 39 may be disposed therebetween so as to prevent such contact.

Figures 7, 9:
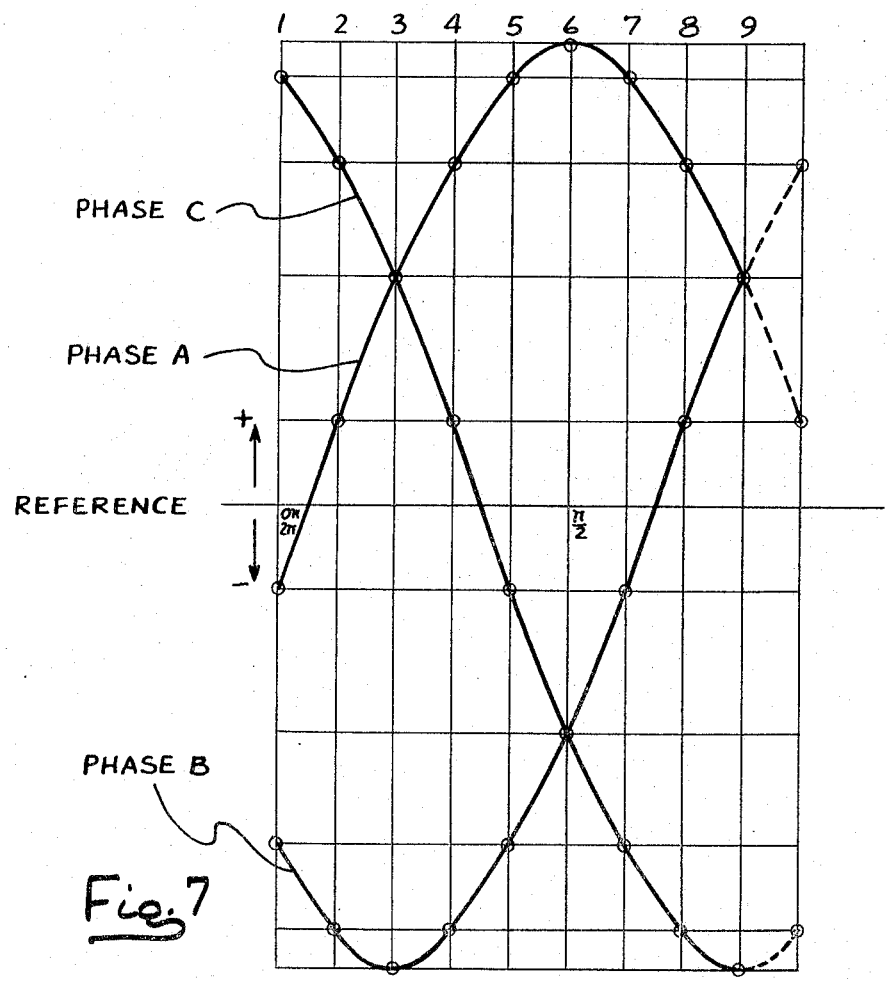
FIG. 7 is a graph which shows the relationship between the number of winding turns of the distributed windings illustrated in FIG. 5.
FIG. 9 is a table illustrating the steps of winding the phase A distributed winding as determined by the figures in the table of FIG. 8.

In accordance with another primary feature of the present invention, the distributed windings are wound approximately according to functions directly related to the functions of the input waves applied thereto. More specifically, in the exemplary arrangement, the windings are wound approximately according to sinusoidal functions. Referring to FIG. 7, the ratios between the input winding turns of the three input winding arrangement in FIGS. 4 and 5 are graphically illustrated. Referring thereto, it may be seen that the number of turns of the windings associated with the cores are determined by sinusoidal functions which are related as a three-phase input, i.e., the sinusoidal waves are disposed 120° out of phase with respect to each other. The relative numbers of windings turns determined by this graphical representation for the nine core arrangement illustrated in FIGS. 4 and 5 are set forth in the table of FIG. 8 wherein $n$ equals any selected base member. Additionally, the actual numbers of winding turns are set forth for a condition when $n=96$. It will be apparent, however, that the actual numbers of winding turns are not determinative of the operation of the frequency multiplier but rather the ratios therebetween are determinative of the operation.

In view of the foregoing, it will be apparent that the number of turns are distributed differently among the three input windings so that no two cores have portions of the input windings associated therewith in which the turns are distributed in accordance with the same ratio. The foregoing data is given by way of example and, accordingly, is not intended to be construed as a limitation on the present invention.

Referring to FIG. 9, a table is shown which illustrates the steps for winding the distributed winding 31A2 when a winding corresponding to that shown in FIG. 5 is to be provided and the turns are to correspond to the numbers in FIG. 8 for $n=96$. First, six turns are wound in a direction selected as positive which will be positioned over the center leg of core 30F only. Seventeen positive turns are then wound which will encompass the center legs of cores 30E–30G. Next, twenty-five positive turns are wound so as to encompass the center legs of cores 30D–30H. Then, thirty-one positive turns are so wound as to surround the center legs of cores 30C–30I. Finally, seventeen positive turns are wound to encompass the center legs of cores 30B–30I. It will thus be seen that the total turns associated with cores 30B–30I will equal the number depicted in FIG. 8 and that the winding turns associated with the cores vary according to a sinusoidal function. Since the number of turns, i.e., winding 31A1, associated with the center leg of core 30A is to be minus seventeen, seventeen negative turns will be separately wound and associated therewith. Subsequently, windings 31A1 and 31A2 may be connected together by conductor 38A. It follows that similar steps will be followed for the windings in phases B and C.

Referring again to FIG. 4, it may be seen that the plurality of output windings 32A–32I correspond in number to the cores 30A–30I, and are wound such that adjacent output windings are wound in the opposite directions so as to respond in opposite manner to flux changes in the associated cores which are in the same direction. That is, in response to a flux change in one core, an output pulse of a first polarity will be produced in the associated output winding whereas in response to a flux change in the same direction in an adjacent core, an output pulse of the opposite polarity will be produced.

In keeping with the present invention, means are provided (1) for connecting all of the output windings 32A–32I in series so that a single phase output having a multiplication factor of nine may be provided and (2) for connecting the output windings in a Y-output connection as illustrated in FIG. 10 so that a multiplied three-phase output having a multiplication factor of three may be provided. For this purpose, windings 32A, 32D and 32G are connected in series, windings 32B, 32E and 32H are connected in series, and windings 32C, 32F and 32I are connected in series. Additionally, a plurality of switches 40A–40D are provided which are interposed between the series output winding arrangements. As may be seen, when the switches 40A–40D are thrown to the left as shown, the output windings 32A–32I are connected in series so that a single-phase output is provided at an associated output terminal 42 having a frequency which is nine times the input wave frequency. Accordingly, a utilization device may be connected to the output terminal 42 for responding to the multiplied single-phase output. Conversely, when the switches 40A–40D are thrown to the right, it will be seen that the output windings 32A–32I are connected in a Y-output circuit as illustrated in FIG. 10 wherein a multiplied three-phase output is provided at an associated three-phase output 43, having a frequency which is three times the input wave frequency. Accordingly, a three-phase utilization device may be connected to output 43 for responding to the multiplied three-phase output.

Though the means for regulating whether a single-phase or three-phase multiplied output is provided are illustrated as simple switches, it is to be understood that the invention is not to be limited to this exemplary arrangement, but rather is intended to cover any desired arrangement for effecting such switching.

For a better understanding of the multiplying operation of the present invention, reference is made to FIGS. 11a–11c wherein a plot of the magnetic flux level in each core in the nine-core chain shown in FIGS. 4 and 5 is set forth. When the algebraic sum of the magnetomotive forces produced by the currents in the three input windings on a given core reverse in polarity, the magnetic flux in each such core is driven across the zero axis. Further, as the magnetomotive force changes from a maximum value of one polarity to a maximum value of the other polarity, the core is driven from one condition of saturation to the opposite condition of saturation. For example, core 30A (FIG. 4) is adapted to change the direction of its magnetic saturation during time interval 1. During time interval 1, the algebraic sum of the magnetomotive forces produced by the three phases A, B and C of the driving wave changes from a maximum value of one polarity to a maximum value of the opposite polarity and core 30A is driven from positive magnetic saturation to negative magnetic saturation. In a similar manner, during time interval 2, currents for phases A, B and C have an effect which drives the flux in core 30B (FIG. 4) from positive saturation across the zero axis to negative saturation, as shown in FIG. 11a. On the other hand, during time interval 2, the current flowing through windings 35A, 36A and 37A associated with core 30A produce a total magnetomotive force therein which holds the latter in the negative magnetic saturation. During time intervals 3–9, there is a uniform rate of progression of the magnetomotive force reversals so that the magnetic flux in each of the cores 32C–32I is successively driven through the zero axis, as shown in FIG. 11a.

During the intervals 10–18, the foregoing operation is repeated, except in the opposite sense. That is, the polarity of the three-phase driving wave is reversed and the flux in each core is driven back through the zero axis during an individual associated time interval. For example, during interval 10 the algebraic sum of the magnetomotive force produced by the three phases of the driving wave adjacent core 30A varies in the opposite direction so that core 30A is driven from negative saturation to positive saturation.

Thus, it is seen that, due to the distribution of the windings, the magnetomotive force reversals progress at a uniform rate and the flux in each core is driven across the zero axis twice during each 360 electrical degrees as shown in FIG. 11a. Therefore, two pulses are induced in each output winding 32A–32I during each complete cycle of the driving wave, as explained above in connection with FIG. 2.

Turning to FIG. 11b, an output wave for the frequency multiplier of FIG. 4 when all the output windings 32A–32I are connected in series is illustrated, the frequency thereof being nine times the input wave frequency. As previously mentioned, the sense of each adjacent output winding is shown as having reversed polarities so that the output pulses induced therein are of opposite polarity when the magnetic flux in the associated cores changes in the same direction. Therefore, the current appearing at the output terminal 42 consists of a series of alternating polarity output pulses as illustrated in FIG. 11b. More particularly, the flux core 30A is shown in FIG. 11a as changing from positive to negative magnetic saturation during interval 1 and it is assumed for this description that the direction in which winding 32A is wound causes a negative-going pulse to appear at terminal 42. In interval 2, the flux in core 30B is driven through the zero axis in the same magnetic direction (i.e., from positive to negative magnetic saturation), however, since the sense of winding 32B is opposite to that of winding 32A, an output pulse opposite polarity appears in time interval 2.

During intervals 10–18, the flux in each core is driven in a reversed magnetic direction; therefore, the output pulses produced during intervals 1 and 10 have reversed polarities as do the output pulses produced during intervals 2 and 11, 3 and 13, etc. Since an odd number of cores (9) are provided in the chain of FIG. 4, the pulses appearing in intervals 9 and 10 have opposite polarities; therefore, a parallel resonant circuit (shown in FIG. 12) may be connected to output terminal 42 to provide a smooth sinusoidal output wave. It is also within the scope of the invention to provide a series resonant circuit when required.

Referring to FIG. 11c, a three-phase output is illustrated which will be provided when the switches 40A–40D are positioned such that the output windings 32A–32I are connected in a Y-output arrangement as illustrated in FIG. 10, the frequency thereof being three times the input wave frequency. The operation of the cores for the three-phase arrangement corresponds to that for the single-phase arrangement and, therefore, reference may be made to the previous description for such operation. The only distinction between this three-phase arrangement and the single-phase arrangement is in the manner in which the output windings are connected. In the event it is desired to provide smooth sinusoidal output waves with the three-phase arrangement, delta capacitor resonant circuits corresponding to that shown in FIG. 12 may likewise be connected to the three-phase output terminals or other three-phase resonant circuits may be utilized.

Though the flux reversals illustrated graphically in FIG. 11a are not shown as requiring the entire time intervals, it will be apparent that the frequency multiplier parameters may be so selected that the flux reversals require the entire time intervals. Under such conditions, a square wave single-phase output will be provided at the output 42 rather than the pulse type output illustrated in FIG. 11b so that a better sinusoidal output wave is produced when the resonant circuit is added to the output.

In view of the foregoing, it may be seen that a frequency multiplier has been provided which may be utilized as a power device for producing an A.C. output. Additionally, it will be apparent that a frequency multiplier has been provided utilizing distributed windings wherein a multiplied single-phase or multiple-phase output having an odd-numbered multiplication factor may be provided, the disclosed device being inherently incapable of having an even-numbered multiplication factor. For example, in the exemplary arrangement, a single-phase output may be provided having a frequency equal to nine times the frequency of the three-phase input. Conversely, if the output windings are connected in the Y-output arrangement, a three-phase output may be provided having a frequency equal to three times the three-phase input frequency. Thus, if the three-phase input has a 60-cycle frequency, a single-phase output having a frequency of 540 cycles per second may be provided or a three-phase output having a frequency of 180 cycles per second may be provided with the exemplary arrangement. Accordingly, a frequency multiplying arrangement has been provided which will function as an A.C. producing power device, wherein a single-phase output may be provided having a frequency equal to the number of cores times the input signal frequency or a multiple-phase output may be provided having a frequency equal to the number of cores times the input signal frequency divided by the number of output phases.

I claim as my invention:

1. In a frequency multiplier having an input circuit adapted to be connected to a source of polyphase sinusoidal current, the combination which comprises, a series of saturable magnetic cores corresponding in number to the desired multiplication factor and being formed of E–I core laminations so that each core defines a pair of substantially closed loop flux paths, output windings wound individually on the center legs of the respective cores and connected in series with an output with adjacent windings being effectively wound in opposite directions, and a plurality of distributed input windings corresponding in number to the number of input phases; each of the distributed windings including turns each of which is wound around the center legs of several of said cores and having at least one turn wound around the center leg of each of said cores and being connected to the input circuit so that each distributed winding is independently associated with one of the input phases whereby the distributed windings are energized, the number of turns of each distributed winding wound around succeeding cores varying according to a desired sinusoidal function and the sinusoidal functions of the distributed windings having a corresponding relationship as the input phases so that the cores are continuously driven in sequence from one state of saturation to the other saturation state in response to energization of the distributed windings whereby bidirectional output signals are induced in the output windings to provide an alternating polarity output signal at the output having a frequency equal to the number of cores times the input frequency.

2. In a frequency multiplier having an input circuit adapted to be connected to a polyphase sinusoidal input, the combination which comprises, a series of saturable magnetic cores corresponding in number to the desired multiplication factor and being formed of E–I core laminations so that each core defines a pair of substantially closed loop flux paths, output windings wound individually on the center legs of the respective cores and connected in series with an output with adjacent windings being effectively wound in opposite directions, and a plurality of distributed input windings corresponding in number to the number of input phases, each of the distributed windings including turns each of which is wound around the center legs of several of said cores, said cores and said windings being spaced so that a desired amount of leakage flux exists, said windings being connected to the input circuit so that each distributed winding receives one of the input phases whereby the distributed windings are energized, the number of turns of each distributed winding associated with succeeding cores varying according to a desired sinusoidal function and the sinusoidal functions having a corresponding relationship as the input phases so that the cores are continuously driven in sequence from one state of saturation to the other state of saturation in response to energization of the distributed windings whereby bidirectional output signals are induced in the output windings to provide an alternating polarity output signal at the output having a frequency equal to the number of cores times the input frequency.

3. In a frequency multiplier having an input circuit adapted to be connected to a polyphase input, the combination which comprises, a series of magnetic core members corresponding in number to the desired multiplication factor times the number of output phases, each core member defining substantially closed loop flux paths, output windings wound individually on the respective core members, a plurality of outputs, selected ones of the output windings being serially connected to the respective outputs with adjacent windings associated with each output circuit effectively wound in opposite directions, and a plurality of distributed windings corresponding in number to the number of input phases, each of said distributed windings being connected to the input circuit so as to receive one phase of the polyphase input, each distributed winding including turns each of which electromagnetically links several of said cores, successive ones of the cores being linked by different combinations of turns of said distributed windings, said combinations being selected to cause the net magnetomotive force exerted on successive cores by currents flowing through said distributed windings to cross zero at successive instants to continuously drive the cores in sequence across a zero axis of magnetic saturation so that bidirectional output signals are induced in the output windings to provide an alternating output signal at each output having a frequency equal to the number of associated cores times the input frequency.

4. In a frequency multiplier having an input circuit adapted to be connected to a polyphase input, the combination which comprises, a series of magnetic core members corresponding in number to the desired multiplication factor times the number of output phases, each core member defining substantially closed loop flux paths, a plurality of output windings connected to different outputs, each output winding being individually wound on selected ones of the core members with adjacent windings effectively wound in opposite directions, and a plurality of distributed windings corresponding in number to the number of input phases, each of said distributed windings being connected to the input circuit so as to receive one phase of the polyphase input, each distributed winding including turns each of which electromagnetically links several of said cores and having at least one turn electromagnetically linking each of said cores, successive ones of the cores being linked by different combinations of turns of said distributed windings, said combinations being selected to cause the net magnetomotive force exerted on successive cores by currents flowing through said distributed windings to cross zero at successive instants to continuously drive the cores in sequence across a zero axis of magnetic saturation so that bidirectional output signals are induced in the output windings to provide an alternating output signal at each output having a frequency equal to the number of associated cores times the input frequency.

5. In a frequency multiplier having an input circuit adapted to be connected to a polyphase input, the combination which comprises, a series of saturable magnetic cores corresponding in number to the desired multiplication factor times the number of output phases, the cores being formed to E–I core laminations so that each core defines a pair of substantially closed loop flux paths, output windings wound individually on the center legs of the respective cores, a plurality of outputs, selected output windings being serially connected to the respective outputs with adjacent windings associated with each output circuit effectively wound in reverse directions, and a plurality of distributed input windings corresponding in number to the number of input phases, the distributed windings surrounding the center legs of the cores so as to be electromagnetically interlinked therewith at least one of said distributed windings including turns singly surrounding the center legs of several of said cores, and distributed windings being connected to the input circuit so that each distributed winding is independently associated with a different input phase whereby the distributed windings are energized, the number of winding turns of each distributed winding associated with succeeding cores varying according to a desired sinusoidal function and the sinuoidal functions of the distributed windings having a corresponding relationship as the input phases so that the cores are continuously driven in sequence from one condition of saturation to the opposite condition of saturation in response to energization of the distributed windings whereby bidirectional output signals are induced in the output windings to provide an alternating polarity output signal at each output having a frequency equal to the number of cores associated therewith times the input frequency.

6. In a frequency multiplier having an input circuit adapted to be connected to a polyphase input, the combination which comprises, a series of saturable magnetic cores corresponding in number to the desired multiplication factor times the number of output phases, the cores being formed of E–I core laminations so that each core defines a pair of substantially closed loop flux paths, output windings wound individually on the center legs of the respective cores, a plurality of outputs, selected output windings being serially connected to the respective outputs with adjacent windings associated with each output circuit effectively wound in reverse directions, and a plurality of distributed input windings corresponding in number to the number of input phases, the distributed windings including turns, each of which is wound around the center legs of several of said cores and having at least one turn wound around the center leg of each of said cores, said cores and said windings being spaced so that a desired amount of leakage flux results from the flow of current in each of said windings and being connected to the input circuit so that each distributed winding is independently associated with a different input phase whereby the distributed windings are energized, the number of turns of each distributed winding wound around the center legs of succeeding cores varying according to a desired sinusoidal function and the sinusoidal functions having a corresponding relationship as the input phases so that the cores are continuously driven in sequence from one condition of saturation to the opposite condition of saturation in response to energization of the distributed windings whereby bidirectional output signals are induced in the output windings to provide an alternating polarity output signal at each output having a frequency equal to the number of associated cores times the input frequency.

7. In a frequency multiplier having an input circuit adapted to be connected to a polyphase input and capable of producing a single phase or polyphase output, the combination which comprises, a series of magnetic core members corresponding in number to the desired multiplication factor for a single phase output and each defining substantially closed loop flux paths, output windings wound individually on the respective core members, switching means having two positions for serially connecting all of the output windings in series with adjacent windings being effectively wound in opposite directions when in a first position so that a single output circuit is formed thereby and serially connecting selected output windings in series with adjacent windings being effectively wound in opposite directions when in the second position so that a plurality of output circuits are formed thereby, and a plurality of distributed windings corresponding in number to the number of input phases each of said distributed windings being connected to the input circuit so as to receive one phase of the polyphase input, each distributed winding including turns singly electromagnetically linking several of said cores, successive ones of the cores being linked by different combinations of turns of said distributed windings, said combinations being selected to cause the net magnetomotive force exerted on successive cores by currents flowing through said distributed windings to cross zero at successive instants to continuously drive the cores in sequence across a zero axis of magnetic saturation whereby bidirectional output signals are induced in the output windings (1) to provide an alternating output signal in the single output circuit having a frequency equal to the number of core members times the input frequency when the switching means is in the first position and (2) to provide an alternating output signal in each output circuit having a frequency equal to the number of associated core members times the input frequency when the switching means is in the second position.

8. In a frequency multiplier having an input circuit adapted to be connected to a three-phase input and capable of producing a single phase or three-phase output, the combination which comprises, a series of magnetic core members corresponding in number to the desired multiplication factor for a single phase output and each defining substantially closed loop flux paths, output windings wound individually on the respective core members, switching means having two positions for serially connecting all of the output windings in series with adjacent windings being effectively wound in opposite directions when in a first position so that a single output circuit is formed thereby and serially connecting selected output windings in series with adjacent windings being effectively wound in opposite directions when in the second position so that three output circuits are formed thereby, and three distributed windings, each of said distributed windings being connected to the input circuit so as to receive one phase of the polyphase input, each distributed winding including turns singly electromagnetically linking several of said cores, successive ones of the cores being linked by different combinations of turns of said distributed windings, said combinations being selected to cause the net magnetomotive force exerted on successive cores by currents flowing through said distributed windings to cross zero at successive instants to continuously drive the cores in sequence across a zero axis of magnetic saturation whereby bidirectional output signals are induced in the output windings (1) to provide an alternating output signal in the single output circuit having a frequency equal to the number of core members times the input frequency when the switching means is in the first position and (2) to provide an alternating output signal in each output circuit having a frequency equal to the number of associated core members times the input frequency when the switching means is in the second position.

9. The method of constructing a frequency multiplier which comprises the steps of forming a plurality of distributed input windings, forming a plurality of output windings, positioning the input and output windings relative to each other so that each output winding is surrounded by desired numbers of input winding turns and so that desired spacings exist therebetween with several turns in each distributed winding singly surrounding several of said output windings, forming a magnetic core about the windings adjacent each output winding so that a portion thereof is surrounded by the windings, connecting the input windings in a desired arrangement, and connecting the output windings in a desired arrangement.

10. The method of constructing a frequency multiplier which comprises the steps of forming a plurality of distributed input windings, forming a plurality of output windings, positioning the input and output windings relative to each other so that each output winding is surrounded by desired numbers of input winding turns and so that desired spacings exist therebetween with several turns in each distributed winding singly surrounding several of said output windings, forming a figure-eight magnetic core about the windings adjacent each output winding so that the windings surround the center leg thereof and the outer legs thereof surround the windings, connecting the input windings in a desired arrangement, and connecting the output windings in a desired arrangement.

11. The method of constructing a frequency multiplier which comprises the steps of forming a plurality of distributed input windings, forming a plurality of output windings, positioning the input and output windings relative to each other so that each output winding is surrounded by desired numbers of input winding turns and so that desired spacings exist therebetween with several turns in each distributed winding singly surrounding several of said output windings, associating a plurality of abutting E core laminations with the windings adjacent each output winding so that (1) adjacent E core laminations face in opposite directions, (2) the center legs of the E core laminations are surrounded by the windings, and (3) the outer legs of the E core laminations surround the windings, associating I core laminations with the E core laminations so that figure-eight magnetic cores are formed thereby, connecting the input windings in a desired arrangement, and connecting the output windings in a desired arrangement.

12. The method of constructing a frequency multiplier which comprises the steps of forming three distributed input windings, forming a plurality of output windings, positioning the input and output windings relative to each other so that each output winding is surrounding by desired numbers of input winding turns and so that desired spacings exist therebetween with several turns in each distributed winding singly surrounding several of said output windings, forming a magentic core about the input and output windings adjacent each output winding so that portions thereof are surrounded by the windings, connecting the input windings in a desired Y-connected arrangement, and connecting the output windings in a desired Y-connected arrangement with adjacent windings effectively wound in opposite directions.

13. The method of constructing a frequency multipiler which comprises the steps of forming three distributed input windings, forming a plurality of output windings, positioning the input and output windings relative to each other so that each output winding is surrounded by desired numbers of input winding turns and so that desired spacings exist therebetween with several turns in each distributed winding singly surrounding several of said output windings, forming a magnetic core about the windings adjacent each output winding so that a portion thereof is surrounded by the windings, connecting the input windings in a desired Y-connected arrangement, and connecting the output windings in a series arrangement with adjacent windings effectively wound in opposite directions.

14. In a frequency multiplier having an input circuit adapted to be connected to a source of polyphase current, the combination comprising
(A) a series of magnetic core members corresponding in number to the desired multiplication factor and each defining substantially closed loop flux paths,
(B) series connected output windings wound individually on the respective core members with adjacent windings being effectively wound in opposite directions,
(C) an output operatively connected to said output windings and
(D) a plurality of distributed windings corresponding in number to the number of input phases and each connected individually to said input circuit to receive one of the input phases,
  (1) each winding electromagnetically linking a plurality of the cores and
  (2) each winding including at least one set of several groups of at least one turn
    (a) with turns of each successive group of a given set electromagnetically linking at least one core in addition to those linked by turns of the preceding group in said set and
    (b) with successive ones of the cores being linked by different combinations of turns of said windings, said combinations being selected to cause the net magnetomotive force exerted on successive cores by currents flowing through said windings to cross zero at successive instants, successive core members thus being driven in sequence across the zero axis of magnetization, inducing bi-directional output signals in the output windings to provide an alternating output signal at the output having a frequency equal to the number of core members times the input frequency.

15. In a frequency multiplier having an input circuit adapted to be connected to a source of polyphase current, the combination which comprises
(A) a series of magnetic core members corresponding in number to the desired multiplication factor and each defining substantially closed loop flux paths,
(B) an output winding connected to an output and individually wound on the respective core members with adjacent windings being effectively wound in opposite directions, and
(C) a plurality of distributed windings corresponding in number to the number of input phases and each connected individually to said input circuit to receive a given phase current from said source, each winding (1) electromagnetically linking all of the cores and
(2) including at least one set of several groups of turns
   (a) with turns of each successive group of a given set electromagnetically linging at least one core in addition to those linked by turns of the preceding group in said set and
   (b) with successive ones of the cores being linked by different combinations of turns of said windings, said combinations being so selected that application of the polyphase input current to said windings causes the net magnetomotive force exerted upon successive cores by currents flowing through said windings to cross zero at successive instants.

References Cited by the Examiner

UNITED STATES PATENTS

| | | | |
|---|---|---|---|
| 1,917,921 | 7/1933 | Burton | 321—68 |
| 2,580,446 | 1/1952 | Lovell et al. | 321—68 |
| 2,811,203 | 10/1957 | Garbarino | 336—234 X |
| 2,887,644 | 5/1959 | Ogle | 321—69 |
| 2,892,141 | 6/1959 | La Fuze | 321—7 |

OTHER REFERENCES

"A New Frequency Multiplier" by M. Camras; Electrical Engineering, September 1962, pages 699–705.

JOHN F. COUCH, *Primary Examiner.*

G. GOLDBERG, *Assistant Examiner.*